C. W. RENEAR.
GRINDING MACHINE.
APPLICATION FILED MAR. 23, 1909.
954,134. Patented Apr. 5, 1910.
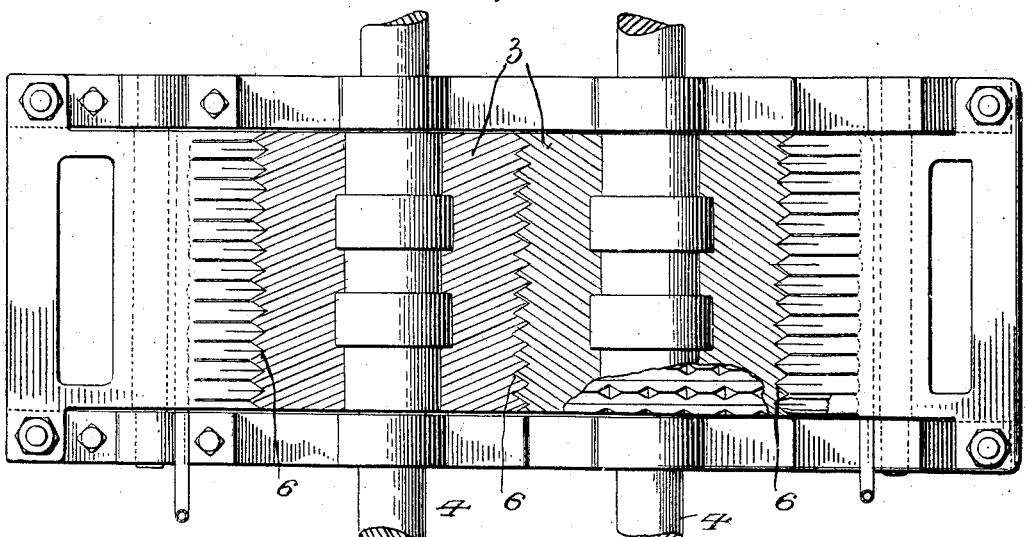
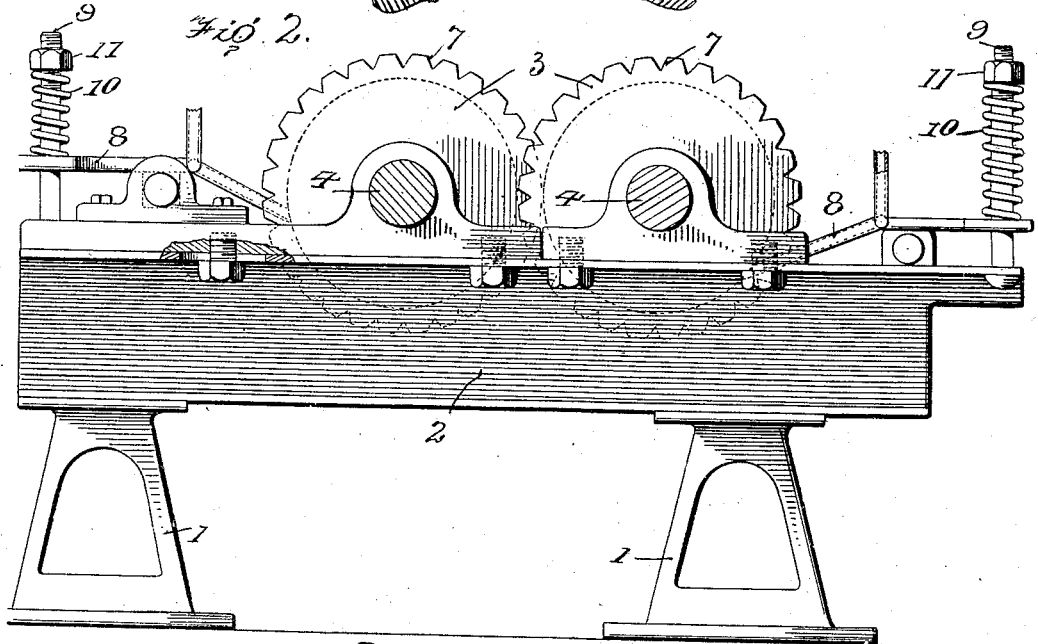
Witnesses
Inventor
Charles W. Renear
By Britton & Gray
Attorneys

UNITED STATES PATENT OFFICE.

CHARLES W. RENEAR, OF HONOLULU, TERRITORY OF HAWAII, ASSIGNOR TO RENEAR COMPANY LIMITED, OF HONOLULU, TERRITORY OF HAWAII.

GRINDING-MACHINE.

954,134.

Specification of Letters Patent. Patented Apr. 5, 1910.

Application filed March 23, 1909. Serial No. 485,196.

*To all whom it may concern:*

Be it known that I, CHARLES W. RENEAR, a citizen of the United States, residing at Honolulu, in the Territory of Hawaii, have invented certain new and useful Improvements in Grinding-Machines, of which the following is a specification.

My invention relates to a grinding and crushing machine which is more especially adapted for the successful crushing or grinding of the Algeroba bean, the product of a tree common to the Hawaiian Islands, and which when properly crushed and ground constitutes an excellent food for stock. The pods of this bean contain little, hard seeds which constitute fully one-half of the food value of the entire bean, but which if not properly crushed or ground are not fully digested by the stock and will produce deleterious results. Continued experiments have been made with the view to obtaining a machine that will successfully crush and grind this bean, but in consequence of the excessive amount of sugar therein it becomes gummy in the operation of grinding to a condition approximating that of sticky rubber and clogs up and renders useless the machines heretofore used for this purpose. After practical tests I have produced a machine which I have found to be effective for this purpose and which successfully crushes the pods of this bean as well as crushes and grinds the little hard seeds contained therein, thus putting them in proper condition to be fed to stock.

While my machine is more particularly adapted to the successful crushing and grinding of the Algeroba bean, it may also be successfully used for the crushing and grinding of other pods and seeds having the same or similar characteristics of the bean referred to.

In the accompanying drawing illustrating my invention Figure 1 is a plan view partly in section of my machine; Fig. 2 a side elevation thereof, and Fig. 3 is an enlarged perspective view of a portion of the face of one of the rolls.

Similar numerals of reference designate like parts in the several figures.

1, 1 designate suitable base pieces or standards on which are mounted the side frames 2, 2, in which frames are journaled a pair of rolls 3, 3, each of which is mounted on a shaft 4, 4, journaled in boxes 5, 5 mounted on the side frames 2, 2. These rolls may be made from steel or cast iron and are placed in horizontal relation one to the other. The rolls are provided with grooves 6 about their circumference preferably to a number of five of such grooves per inch of face surface of the roll, and cut at an angle of 60°, and also with longitudinal grooves 7, in number the same per inch as the grooves 6 and also at the same angle, but such grooves 7 are cut only one-half as deep as the grooves 6. The bottom portions of the longitudinal grooves are wider than the upper portions thereof, and such bottom portions are parallel with the axis of the roll. The grooves are cut to such a depth as to leave sharp cutting edges between the same. The rolls are, as stated arranged in longitudinal relation, one with the other, and in close proximity, so that the circumferential grooves upon their faces intermesh. Preferably the forward roll of the pair is mounted in an adjustable bearing in order that it may be moved to or from the rear or fixed roll. Scrapers 8 are mounted at each end of the machine, said scrapers having their forward edges provided with teeth which mesh with the grooves of the rolls and keep them clean and free them from gelatinous matter. The scraper 8 at the front of the machine is also adjustably mounted in order that it may be moved as the position of the adjustable roll is changed. The scraper operating on the fixed roll may obviously have a fixed mounting. Each of the scrapers is provided with a standard 9 carrying a spiral spring 10 and a nut 11 by which the pressure of such scraper on the roll may be increased or diminished. The scrapers are water-jacketed with small hose connection, to keep them cool.

The material to be crushed and ground is fed from above and the rolls are run at a high rate of speed. The longitudinal grooves in the faces of the rolls serve to tear or shred the entire product and also draw or feed the beans between the co-acting faces of the rolls when the same are running at the high rate of speed desired. This rate of speed with its centrifugal force practically eliminates all of the crushed product and increases the capacity of the machine, thus making it a commercial success. The circumferential grooves constitute a large crushing surface and also cut or shred the material. The high rate of speed at which the rolls are operated eliminates nearly all of the crushed product, including the gummy substance produced by the saccharine matter in the bean, the remaining gummy substance not thus eliminated being removed from the grooves by the scrapers.

In the operation of my machine upon the Algeroba bean for the successful crushing or grinding of which the same is primarily designed, I have found that all of the little, hard seeds contained in said bean are crushed and ground and that the other constituents of such bean are cut, shredded and crushed whereby all of the component parts of the said bean are put in condition for feeding cattle or other stock, thus forming a highly nutritious food for such purpose.

I realize that considerable variation is possible in the details of construction and arrangement of parts without departing from the spirit of my invention, and I therefore do not intend to limit myself to the specific form shown and described.

What I claim as new and desire to secure by Letters Patent is—

In a machine of the class described, a pair of rolls, each roll having a series of circumferential beveled grooves which form spaced annular ribs, said ribs having a series of longitudinal beveled grooves which are of less depth than the circumferential grooves, the bottoms of said longitudinal grooves being parallel with the plane of the axis of the roll, the difference in depth between the circumferential and longitudinal grooves leaving the walls of the circumferential grooves with uninterrupted surfaces below the plane of the bottom of the longitudinal grooves, the ribs of one roll fitting snugly and revolving in the circumferential grooves of the adjacent roll.

In testimony whereof I affix my signature in presence of two witnesses.

CHARLES W. RENEAR.

Witnesses:
WILFRID A. GREENWELL,
DAVID L. WITTINGTON.